United States Patent [19]

Kihara et al.

[11] 3,968,518

[45] July 6, 1976

[54] MAGNETIC RECORDING AND/OR REPRODUCING APPARATUS FOR VIDEOTAPE EDITING

[75] Inventors: Nobutoshi Kihara, Tokyo; Tsuguo Miki, Tachikawa, both of Japan

[73] Assignee: Sony Corporation, Tokyo, Japan

[22] Filed: Mar. 4, 1975

[21] Appl. No.: 555,107

Related U.S. Application Data

[63] Continuation of Ser. No. 384,577, Aug. 1, 1973, abandoned.

[30] Foreign Application Priority Data

Aug. 4, 1972  Japan.............................. 47-78102

[52] U.S. Cl..................................... 360/14; 360/74; 360/10
[51] Int. Cl.²....................................... G11B 27/02
[58] Field of Search .................. 360/10, 14, 33, 35, 360/70, 73, 74

[56] References Cited
UNITED STATES PATENTS 3,180,930   4/1965   Bounsall .............................. 360/14

Primary Examiner—Bernard Konick
Assistant Examiner—Alan Faber
Attorney, Agent, or Firm—Lewis H. Eslinger; Alvin Sinderbrand

[57]    ABSTRACT

In a video signal recording and reproducing apparatus having one or more rotary heads for recording or reproducing video signals in tracks extending obliquely across a magnetic tape as the latter is transported or driven about a guide drum and a fixed head for recording or reproducing control signals at spaced locations along the tape corresponding to the tracks, the tape is automatically brought to rest with its last recorded or reproduced track at a predetermined position relative to the path of the rotary heads whenever driving of the tape is halted, as for the still reproduction of a television picture or for the editing of the video signals recorded on the tape.

17 Claims, 24 Drawing Figures

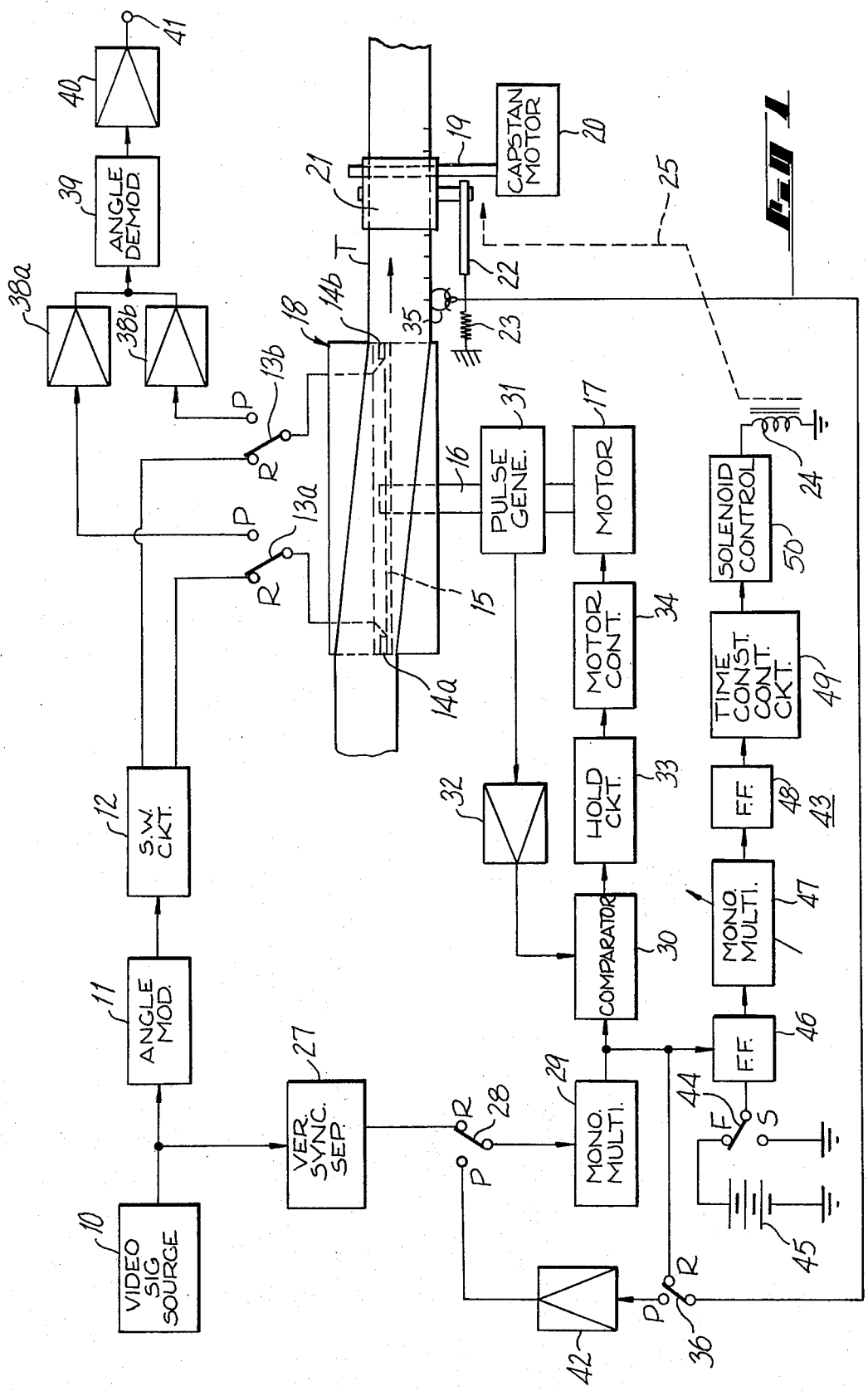

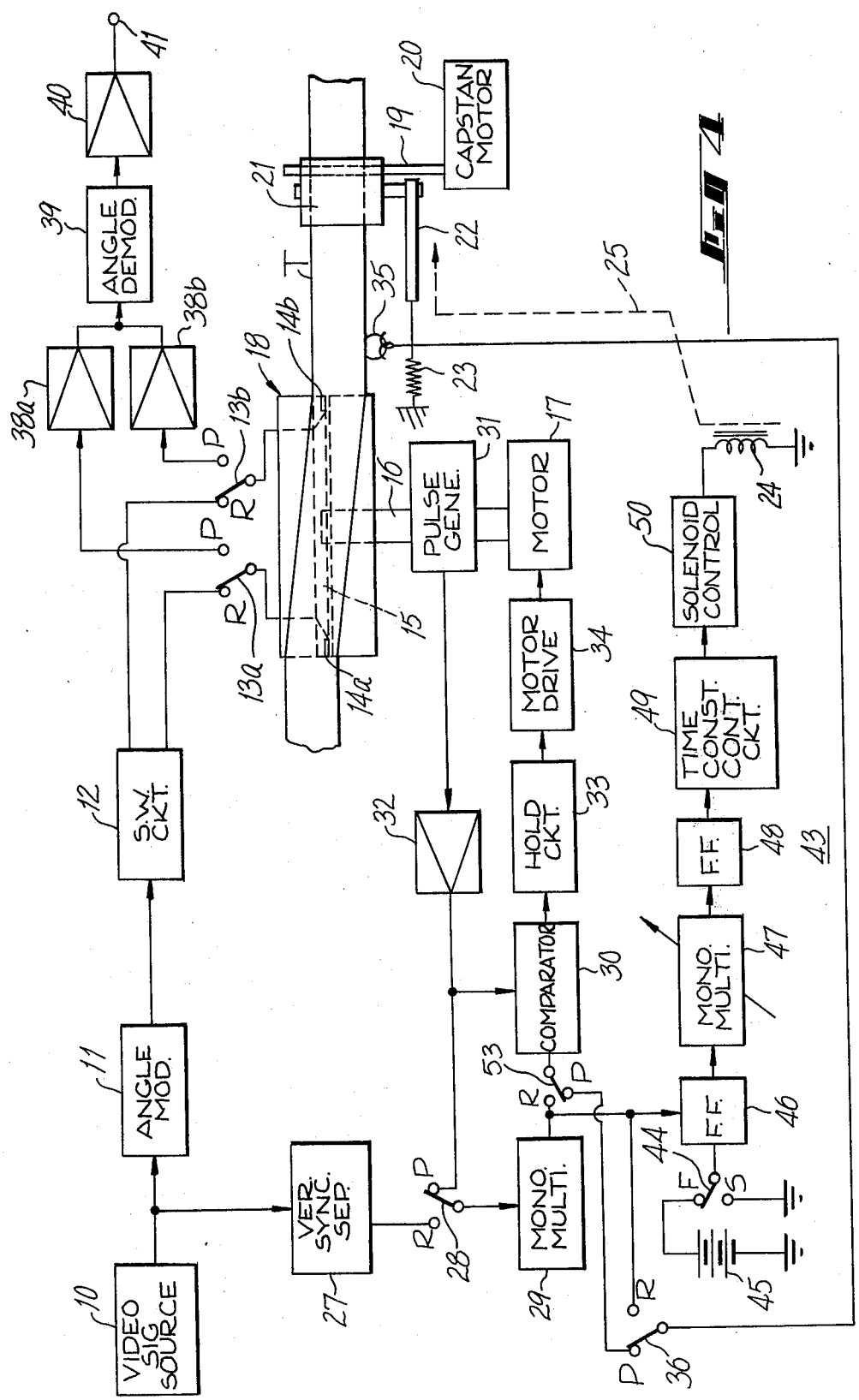

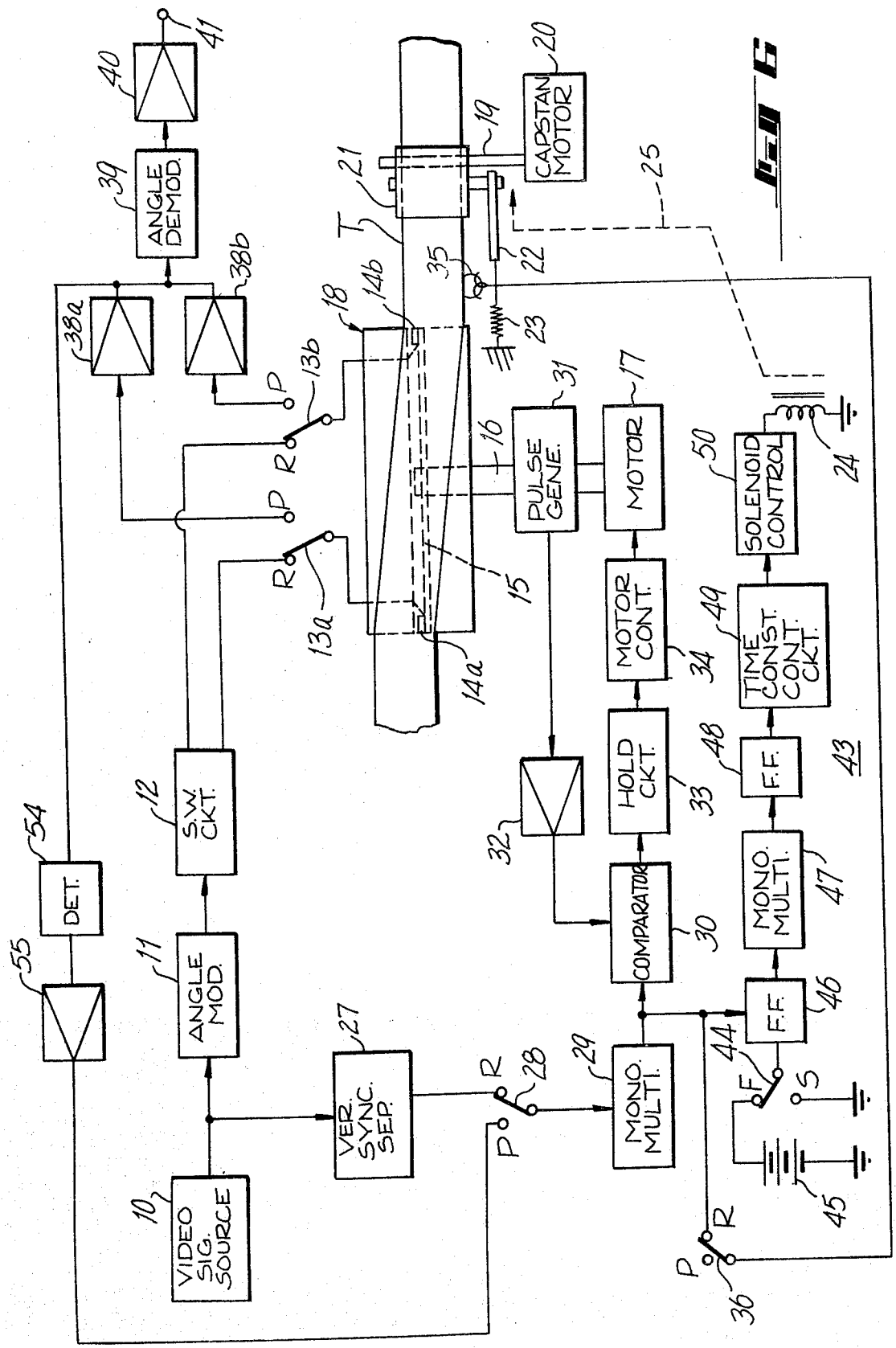

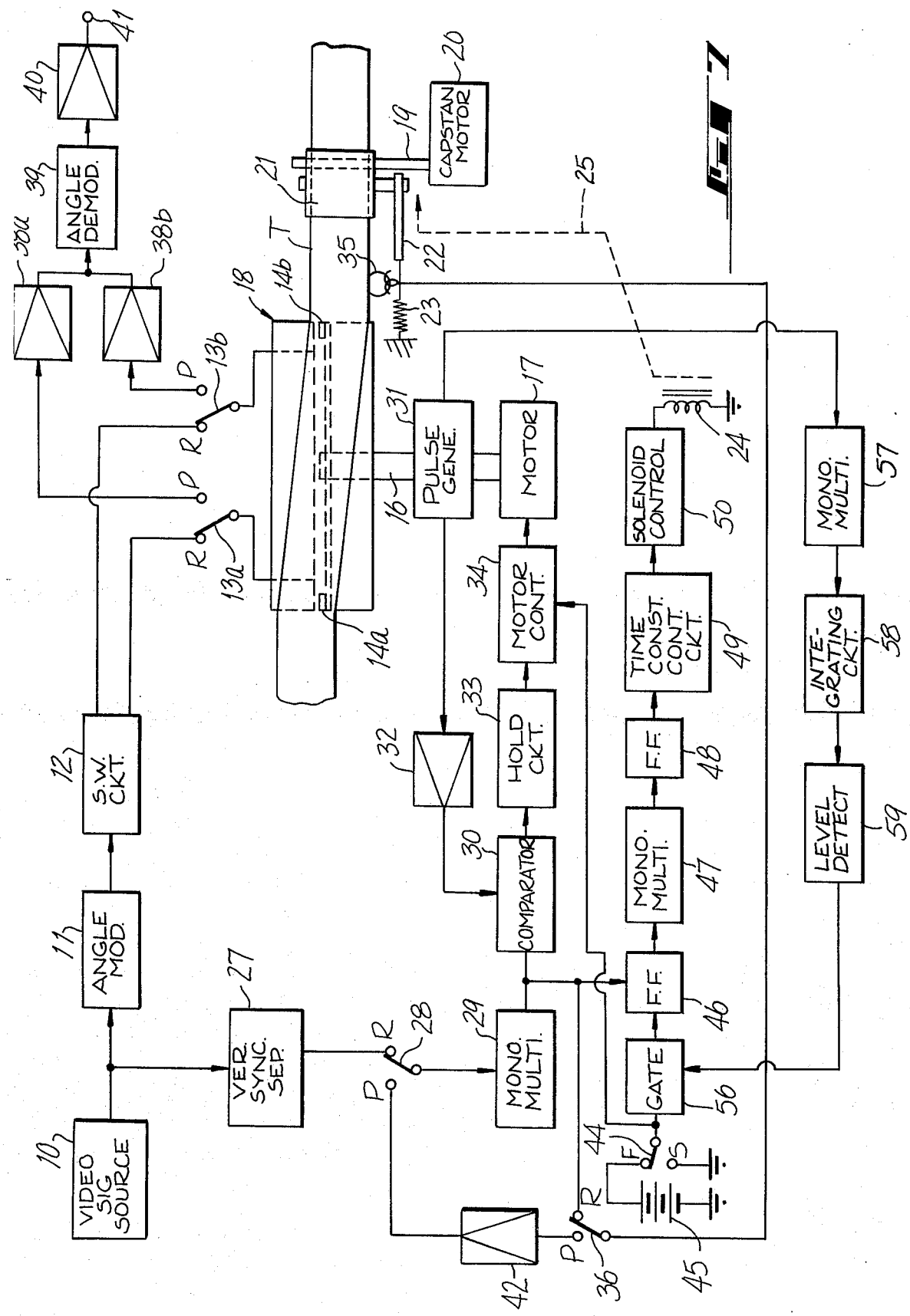

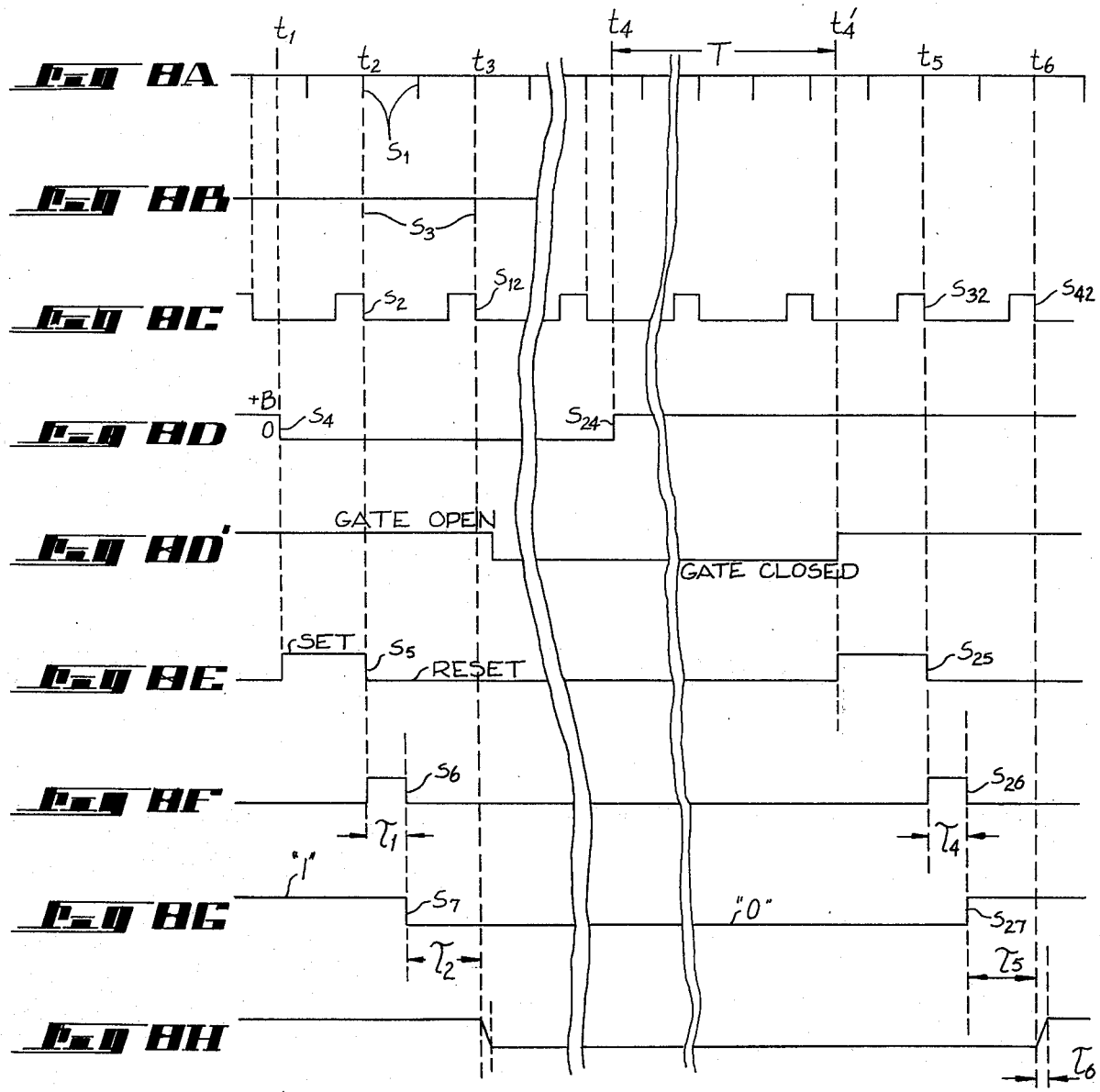

MAGNETIC RECORDING AND/OR REPRODUCING APPARATUS FOR VIDEOTAPE EDITING

This is a continuation of appliction Ser. No. 384,577, filed Aug. 1, 1973 now abandoned.

BACKGROUND OF THE INVENTION

1. Field of the Invention

This invention relates generally to magnetic recording and reproducing apparatus of the type in which signals are recorded on a magnetic tape in tracks extending obliquely across the latter by means of one or more rotary heads, and more particularly is directed to improvements in such apparatus for use in the editing of video signals to be recorded or reproduced thereby, or in the still reproduction of a television picture by the repeated reproduction of a video signal recorded in one of the tracks.

2. Description of the Prior Art

In existing apparatus of the described type, during the recording of video signals in the oblique tracks on the tape by means of the rotary head or heads, control signals derived from the vertical synchronizing pulses or portions of the video signals for each field or frame of the television picture are recorded by means of a fixed head at correspondingly spaced apart locations along the tape. During the recording and reproducing operations, reference signals derived from the vertical synchronizing pulses or from the recorded control signals, respectively, are compared with reference signals indicating the rotational positions of the rotary head or heads to control the rotational speed of the latter and therby ensure that the video signals for each field or frame are properly recorded in a respective oblique track or that the oblique tracks are properly scanned by the rotary heads, respectively.

In recording video signals it may be desired to record only certain portions of the video signals being received from a suitable source, for example, for the purpose of editing the received signals or for economizing on the amount of tape being consumed. During the reception of a portion of the video signals which is not to be recorded, the driving of the tape is halted and the rotary heads are made inoperative to record that portion of the received video signals. Thereafter, when the video signals being received are again to be recorded, the driving of the tape is restarted and the heads are again made operative to record the received video signals and the control signals. Similarly, in editing recorded video signals, it may be desired to retain only certain portions of the recorded video signals and to replace another portion of the recorded signals with other video signals being received from a suitable source. In the latter case, the recorded video signal are reproduced until the end of the portion thereof to be retained, at which point driving of the tape is halted, the operation of the apparatus is switched from its reproducing mode to its recording mode and driving of the tape is restarted for recording thereon the new video signals being received.

However, when a tape is being edited, as aforesaid, with the existing apparatus of the described type, the actuation of the control switch or the like provided for halting and restarting the driving of the tape can occur at any random point in time relative to the reference or control signals which are being recorded on, or reproduced from the tape. Thus, when driving of the tape is halted, the tape can come to rest with the last recorded or reproduced track and its corresponding control signal on the tape at random positions relative to the fixed head. Similarly, when driving of the tape is restarted, the time delay between the actual commencement of movement of the tape and the occurrence of the next reference or control signal to be recorded on the tape is indeterminate. Thus, the distance along the tape between the control signals and the respective oblique record tracks that immediately precede and follow the location of a splice, that is, the junction between signals recorded before and after halting of the tape drive, may vary from the uniform or standard distance along the tape between the control signals and respective record tracks recorded during normal recording operation. As a result of the foregoing, when the signals recorded on the edited tape are reproduced, the control signals that follow the location of the splice will be out of phase relative to the control signals preceding the splice, and consequently so-called "jitter" will occur in the picture reproduced from the video signals recorded on the edited tape.

A similar problem is encountered when the existing apparatus has its tape drive halted for the still or stop motion reproduction of a television picture by the repeated scanning of the video signal recorded in one of the oblique tracks. Since the angle between the record tracks and the longitudinal axis of the tape is influenced by the 192 or movement of the tape about the guide drum during recording, it will be apparent that the rotary head or heads will scan along a line or path at an angle to the record tracks when the tape is at rest for still reproduction. Further, in order to provide a high density of video information on the tape, the spacing between adjacent oblique record tracks is desirably made very narrow. Therefore, if when the tape drive is halted for still or stop motion reproduction the head or heads scan along a line or path that cuts across the opposite end portions of two adjacent record tracks, the different signals recorded in such tracks may interfere and further so-called "drop-out" may occur at the center of the resulting picture. In order to avoid the foregoing, it is necessary that the line or path along which the head or heads scan the tape when the latter is at rest intersect the longitudinal median of an oblique record track at the middle of the latter, that is, mid-way between the ends of the oblique track. However, as previously mentioned, in the existing apparatus, the position at which the tape actually comes to rest upon the halting of the tape drive is not precisely determined with the result that the rotary head or heads may disadvantageously scan end portion of two adjacent tracks. Accordingly, it has been the practice to manually adjust the position of the tape after it has come to rest for obtaining the proper still reproduction of the video signal recorded in a single oblique track.

SUMMARY OF THE INVENTION

Accordingly, it is an object of this invention to provide a magnetic recording and reproducing apparatus of the described type which avoids the above mentioned disadvantages of the existing apparatus.

More specifically, it is an object of this invention to provide a magnetic recording and reproducing apparatus of the described type by which video signals can be edited, as aforesaid, without the possibility of any phase error occurring between the recorded control signals and video signals that precede and follow, respectively, a splice or interruption in the driving of the tape.

Another object is to provide a magnetic recording and reproducing apparatus, as aforesaid, in which, when driving of the tape is halted for still or stop motion reproduction of video signals recorded on the tape, the tape will automatically come to rest at a position for proper scanning of the selected oblique track by the rotary head or heads.

In accordance with an aspect of this invention, a magnetic recording and reproducing apparatus of the described type has a reference signal generator for producing reference signals in correspondence to the video signals recorded, or to be recorded in each of the record tracks, a control switch or the like selectively actuable for initiating the starting and stopping of the operation of the tape drive, a detecting or sensing circuit for detecting the occurrence of a predetermined one of the reference signals following an actuation of the control switch, and means controllable by the detecting circuit upon the detection of the predetermined reference signal for actually starting or stopping the tape drive in dependence on the selective actuation of the control switch. The reference signals which are detected upon the actuation of the control switch for either halting or initiating the driving of the tape with the apparatus in its recording mode may be derived from the video signals being recorded, for example, from the vertical synchronizing signals or pulses separated from such video signals. When the apparatus is in its reproducing or playback mode, the reference signals which are detected upon the actuation of the control switch for halting the driving of the tape may be derived from the control signal recorded on the tape and being reproduced by the fixed head, from the video signals being reproduced by the rotary heads, or from the rotational reference signals indicating the rotational positions of the rotary heads which are synchronized with the control signals being reproduced by the fixed head. When the control switch is actuated for initiating the driving of the tape with the apparatus in its reproducing or playback mode, for example, when it is desired to resume normal reproduction of a recorded television picture after a period of still reproduction thereof, the detected reference signals may be derived from the video signals being reproduced or from the rotational reference signals indicating the rotational positions of the rotary heads.

With the foregoing arrangement according to an aspect of this invention, when the control switch is actuated for stopping the tape drive, the tape automatically comes to rest with the last recorded or reproduced control signal in a predetermined position relative to the fixed head. Thus, for example, in the case of stopping the tape drive for still or stop motion reproduction of the video signals in a selected oblique track on the tape, the tape automatically comes to rest in a position for proper scanning of the selected track by the rotary head or heads. When the control switch is actuated for starting the tape drive, for example, when editing the tape in the manner described above, the actual movement of the tape commences only at a predetermined time following the occurrence of the detected reference signal with the result that the spacing between the control signals and the respective oblique record tracks that immediately precede and follow the splice or interruption in tape movement is equal to the spacing between the control signals and the tracks of the video signals recorded on the tape during continuous recording operation.

In the case of a battery powered apparatus in which rotation of the guide drum and rotary heads is halted when there is an interruption or pause in the driving of the tape, it is a further feature of this invention to detect the rotational speed of the rotary heads after the control switch is actuated for starting the tape drive and to detect a reference signal only after the detected speed of the rotary heads has attained a predetermined value, whereby to ensure that, when editing a tape, as aforesaid, the rotary heads scan the tape at the desired speed in the tracks immediately following the splice.

The above, and other objects, features and advantages of the invention, will be apparent in the following detailed description of illustrative embodiments of the invention which is to be read in connection with the accompanying drawings.

BRIEF DESCRIPTION OF THE DRAWINGS

FIG. 1 is a schematic block diagram of circuits provided in accordance with an embodiment of the present invention for controlling the stopping and starting of the tape drive in a magnetic recording and reproducing apparatus;

FIG. 4 is a view similar to that of FIG. 1, but showing another embodiment of the invention;

FIG. 6 is another view similar to FIG. 1, but showing a modification thereof;

FIG. 7 is still another view similar to that of FIG. 1, but showing a further embodiment of the invention particularly suited for incorporation in a battery-powered apparatus; and FIGS. 8A to 8H are graphic representations of various waveforms to which reference will be made in explaining the operation of the apparatus illustrated on FIG. 7.

DESCRIPTION OF THE PREFERRED EMBODIMENTS

Figure 3:
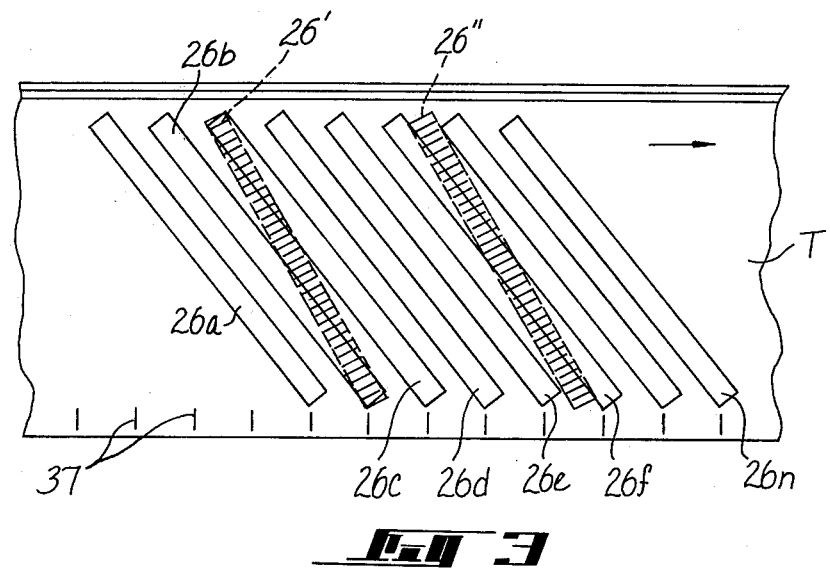
FIG. 3 is an enlarged schematic view of a section of the magnetic tape showing the oblique tracks in which video signals are recorded and representative traces scanned by the rotary heads when the tape is at rest.

Referring to the drawings in detail, and initially to FIG. 1 thereof, it will be seen that, in the recording and reproducing apparatus there illustrated, the output of a suitable source 10 of video signals is applied to an angle-modulator 11, and the angle-modulated signals issuing from modulator 11 are supplied to a switching circuit 12 so as to be alternately applied to the record contacts R of ganged record and playback switches 13a and 13b, respectively. The switches 13a and 13b have their movable contacts suitably connected, as through slip rings, with respective rotary magnetic heads 14a and 14b which are mounted at the opposite ends of a support arm 15. Arm 15 is mounted, at its center, on a rotary shaft 16 driven by a variable speed electric motor 17 so that rotary heads 14a and 14b move in a circular path that substantially coincides with the peripheral surface of a cylindrical tape guide drum 18 which may be rotatable with the heads. A magnetic tape T is suitably guided so as to extend helically about at least a portion of the periphery of guide drum 18, and tape T extends from guide drum 18 between a capstan 19 driven by an electric motor 20 and a pinch roller 21. The pinch roller 21 is rotatably supported by a movable support arm 22 which is urged, as by a spring 23, to move in a direction for spacing pinch roller 21 from capstan 19, whereby to halt the driving of tape T by rotated capstan 19. An electromagnetic device, for example, a solenoid 24, has its armature suitably connected to support arm 22, as indicated schematically at 25, so that, upon energizing of solenoid 24, arm 22 is moved against the opposition of spring 23 for pressing pinch roller 21 against rotated capstan 19 and thereby causing the driving of tape T therebetween. It will be apparent that, when tape T is thus driven by the cooperative action of rotated capstan 19 and pinch roller 21, the rotated magnetic heads 14a and 14b scan successive tracks which extend obliquely across the tape, for example, as indicated at 26a, 26b, 26c, - - - 26n on FIG. 3.

The switching circuit 12 is suitably controlled so that the alternation of the output thereof between the record contacts of switches 13a and 13b will occur at either the frame frequency or the field frequency of the video signals received from source 10, for example, at the frequency of 30C/sec. or 60C/sec., respectively. In the embodiment being described, switching circuit 12 is switched at the frame frequency of the video signals, with each switching action occurring during a horizontal blanking period so that, during recording, each of rotary heads 14a and 14b will be effective to record the video signals corresponding to a frame of a television picture in a respective one of the oblique tracks 26a - - - 26n.

A portion of the video signals from source 10 is supplied to a vertical synchronizing signal separator circuit which produces a pulse signal $S_1$ (FIG. 2A) at the field frequency for example, 60C/sec. The pulse signal output $S_1$ of circuit 27 is applied to the record contact R of a record and playback switch 28 having its movable contact connected to a monostable multivibrator 29. Monostable multivibrator 29 is suitably arranged so that, when in its stable state, a positive or relatively high output potential is provided and, when in its unstable state, a negative or relatively low potential output is obtained. Further, monostable vibrator 29 preferably has a time constant greater than the period between the successive pulse signals $S_1$ from separator circuit 27 so that, when multivibrator 29 is triggered to its unstable state by a pulse signal $S_1$, for example, at the $t_2$ on FIG. 2A, it will remain in that unstable state for a period beyond the next pulse signal $S_1$ and then return to its stable state until it is again triggered by a pulse signal $S_1$ at the time $t_3$. Accordingly, monostable multivibrator 29 is triggered only by every other pulse signal $S_1$ from separator circuit 27. As shown on FIG. 2C, the output of multivibrator 29 is composed of a train of pulses of positive or relatively high potential corresponding to the stable state, as at $S_2$, $S_{12}$, $S_{22}$, $S_{32}$ and $S_{42}$, occurring at the frame frequency, that is, one-half the frequency of the pulse signals $S_1$, and each terminating in correspondence with a respective one of pulse signals $S_1$.

The above described output of multivibrator 29 constituting a reference signal is supplied to a comparator 30 which also receives a reference signal indicating the rotational or angular position of rotary heads 14a and 14b. Such reference signal may be produced by a pulse generator 31 which is, for example, composed of diametrically opposed magnets mounted on shaft 16 and cooperating with a fixed magnetic head or coil (not shown) to produce electrical pulses which are fed through a pulse-shaping amplifier 32 to comparator 30. The comparator 30 compares the phase of the reference signal from generator 32 with the phase of the reference signal from multivibrator 29 and, in the event of a phase deviation, produces an error or correcting signal which is fed through a hold circuit 33 to a motor control circuit 34 by which the rotational speed of motor 17 is regulated. It will be apparent that the foregoing conventional arrangement is provided to ensure that each of rotary heads 14a and 14b will commence the scanning or tracing of an oblique track extending across tape T simultaneously with the commencement of the video signals corresponding to a respective frame.

The illustrated magnetic recording and reproducing apparatus is further shown to include a fixed magnetic head 35 disposed adjacent the path of travel of tape T and which, during recording operation of the apparatus, receives a portion of the output or reference signal from multivibrator 29 through the record contact of a record and playback switch 36 so that corresponding control signals are recorded on an edge portion of tape T at spaced apart locations along the latter corresponding to the respective oblique record tracks, for example, as indicated at 37 on FIG. 3.

Figures 2A, 2B, 2C, 2D, 2E, 2F, 2G, 2H:
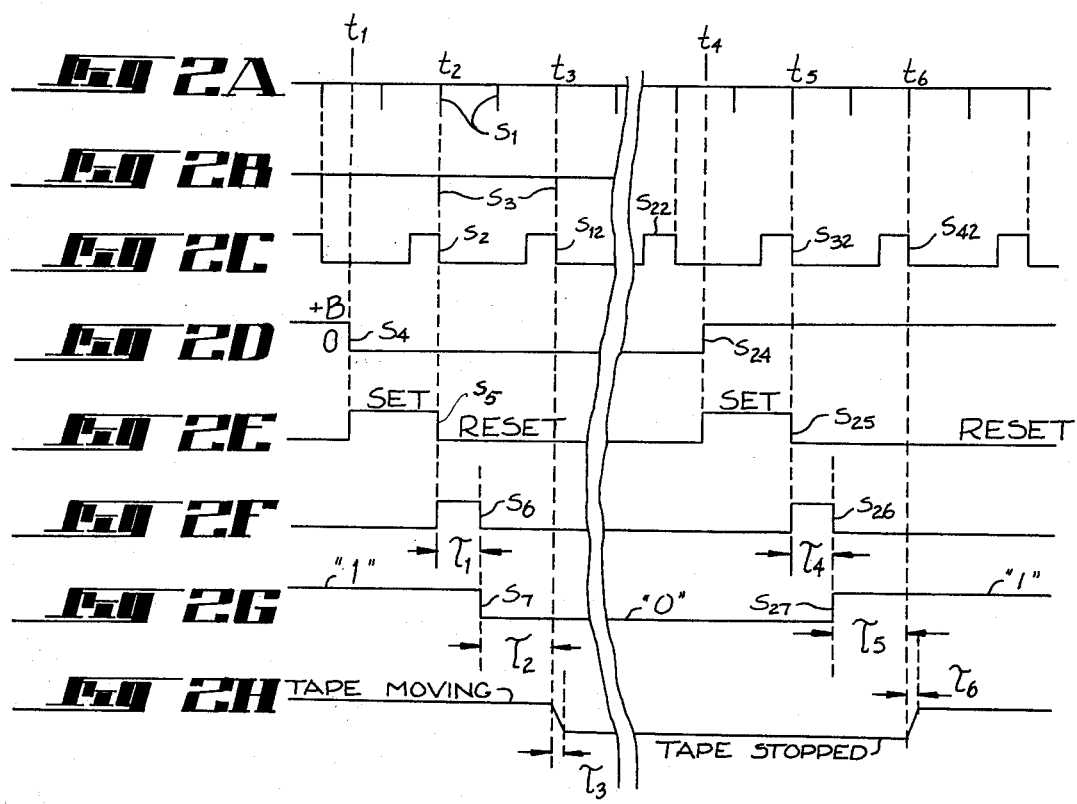
FIGS. 2A to 2H are graphic representations of various waveforms to which reference will be made in explaining the operation of the apparatus illustrated on FIG. 1.

For the playback or reproducing operation of the illustrated apparatus, the latter is shown to include playback amplifiers 38a and 38b connected with the playback contacts P of switches 13a and 13b for receiving the video signals alternately reproduced by rotary heads 14a and 14b, respectively, when switches 13a and 13b are changed to their playback positions. The amplified outputs of amplifiers 38a and 38b are demodulated in an angle-demodulator 39, and the demodulated output of the latter is supplied through an amplifier 40 to an output terminal 41, which may be connected to a television monitor (not shown). Further, during playback operation, switches 28 and 36 are also changed over to their playback positions in which the movable contacts of such switches engage their playback contacts P between which a pulse shaping amplifier 42 is connected so that the control signals reproduced from tape T by fixed magnetic head 35, for example, as indicated at $S_3$ on FIG. 2B, are supplied through switch 36, pulse shaper 42 and switch 28 to monostable multivibrator 29 for triggering the latter. Accordingly, during playback or reproducing operation of the apparatus, multivibrator 29 again produces a reference signal, as represented by the chain of pulses on FIG. 2C, which comparator 30 compares with the reference signal from pulse generator 31 for suitably controlling motor 17 so that rotary heads 14a and 14b properly scan and reproduce the video signals recorded in the successive oblique tracks 26a–26n.

In accordance with the present invention, a magnetic recording and reproducing apparatus of the type described above is provided with a circuit 43 for controlling the operation of the tape drive constituted by capstan 19 and pinch roller 21. As shown on FIG. 1, such circuit 43 for controlling the operation of the tape drive includes a control switch 44 having a movable contact that is selectively actuable to engage a fixed contact F for initiating the forward movement of the tape by operation of the tape drive or to engage a fixed contact S for initiating the stopping of the tape drive. The fixed contacts F and S of switch 44 are respectively connected to a battery or DC voltage source 45 and to ground, while the movable contact of switch 44 is connected to the set terminal of a flip-flop circuit 46 which further has a reset terminal receiving a portion of the reference signal from monostable multivibrator 29. The flip-flop circuit 46 is arranged to be triggered to a first or set stable state providing a positive or relatively high potential output, for example, as indicated at set on FIG. 2E, in response to a change, that is, either an increase or decrease, in the potential applied to its set terminal through switch 44. Further, flip-flop 46 is changed over from such first or set stable state to a second or reset stable state in response to the application to the reset terminal of a negative-going pulse from multivibrator 29, that is, in response to the decreasing potential at the termination of each of the reference signal pulses $S_2$–$S_{42}$. In such second or reset state of flip-flop circuit 46, the output thereof has a negative or relatively low potential, for example, as indicated at reset on FIG. 2E.

The output of flip-flop circuit 46 is applied to a monostable multivibrator 47 having a variable time constant, and such multivibrator 47 is triggered to its unstable state in response to a negative-going pulse from flip-flop circuit 46, that is, in response to the changeover of the flip-flop circuit from its first or set state to its second or reset state. The monostable multivibrator 30 provides a negative or relatively low potential output when in its stable state and, when triggered to its unstable state, multivibrator 30 provides a positive or relatively high potential output for a predetermined period, for example, as indicated at $\tau_1$ and $\tau_4$ on FIG. 2F, in dependence on the setting or adjustment of its variable time constant. The output of monostable multivibrator 47 is applied to a flip-flop circuit 48 which, as shown on FIG. 2G, is triggered or changes its state in responsee to each negative-going pulse from multivibrator 47 to change the output of flipflop circuit 48 from a nominal output potential of 1 to a nominal output potential of 0, or from the nominal output potential of 0 to the nominal output potential of 1. The output of flip-flop circuit 48 is supplied, through a time constant control circuit 49 if necessary for the reasons hereinafter described, to a solenoid control circuit 50 which energizes solenoid 24 and thereby causes operation of the tape drive, when the output of flip-flop circuit 48 is nominal 1, and which deenergizes solenoid 24, and thereby halts the operation of the tape drive, when the output of flip-flop circuit 48 is nominal 0.

Figure 5:
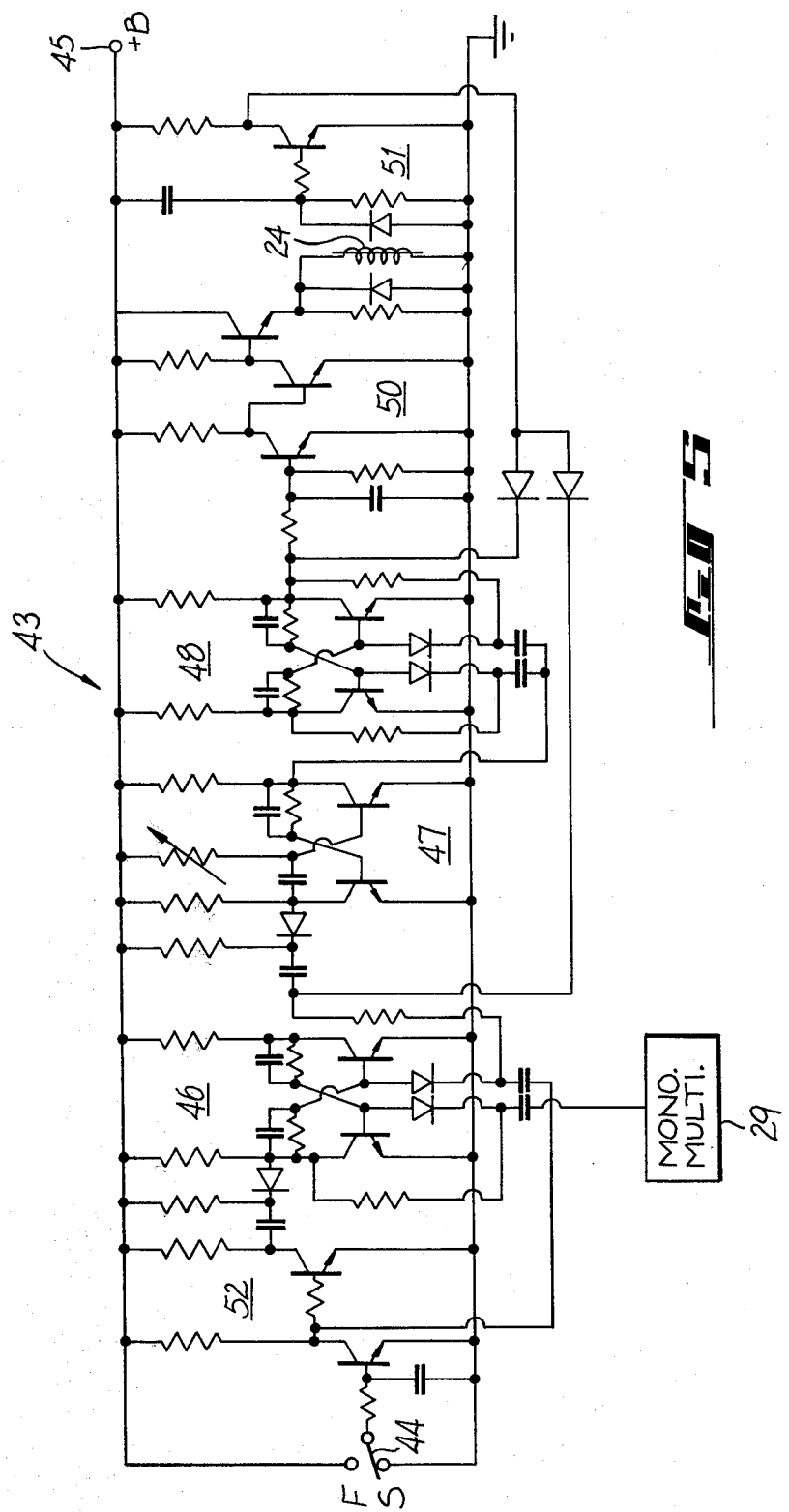
FIG. 5 is a detail schematic circuit diagram of circuits that may be employed in the embodiments of FIGS. 1 annd 4 for controlling the energization of a solenoid associated with the tape drive.

Referring now to FIG. 5 which illustrates details of the circuit components 44–50 included in the control circuit 43, it will be seen that such control circuit 43 may further include a circuit 51 by which flip-flop circuit 46 is originally preset to its second or reset state and flip-flop 48 is preset to its state providing a nominal 1 output prior to the initiation of a recording or reproducing operation of the apparatus. Further, as shown, circuit 43 may include a signal wave-shaping circuit 52 interposed between switch 44 and flip-flop circuit 46 so that the latter will be changed over to its first or set state in response to any change in the potential applied to the set terminal by actuation of switch 44 from its contact F to its contact S or from its contact S to its contact F.

When video signals received from source 10 are being recorded and it is desired to edit such signals, for ecample, to omit certain portions of the received video signals from those being recorded on tape T, the above described apparatus in accordance with this invention operates as follows:

During the recording operation of the apparatus, switches 13a, 13b, 28 and 36 are all disposed to engage their respective record contacts R, and control switch 44 is disposed to engage its contact F so that solenoid 24 is energized and capstan 19 and pinch roller 21 cooperate to drive tape T. The vertical synchronization pulse $S_1$ (FIG. 2A) at the standard field frequency of 60 fields/sec. is separated from the received video signals by circuit 27 and applied through switch 28 to monostable multivibrator 29 which, as previously described provides, at its output, a reference signal constituted by a chain of pulses $S_2$–$S_{42}$ (FIG. 2C) at the standard frame frequency of 30 frames/sec., with each output pulse terminating in correspondence with a respective vertical synchronizing pulse $S_1$. The reference signal from multivibrator 29 is compared with the reference signal from generator 31 to control motor 17 and thereby ensure that the video signals corresponding to successive frames, and being supplied alternately to rotary heads 14a and 14b through switching circuit 12 and switches 13a and 13b, will be accurately recorded in the oblique tracks which are scanned or traced by the rotary heads on the driven tape. Simultaneously, the reference signal from monostable multivibrator 29 is supplied through switch 36 to fixed head 35 so that the latter records the corresponding control signals 37 on the tape at spaced apart locations along the latter corresponding to respective oblique tracks in which video signals are recorded.

At the commencement of normal or continuous recording of video signals, flip-flop circuits 46 and 48 are preset by circuit 51 to the reset state of flip-flop 46 and to the state of flip-flop 48 providing the nominal 1 output so that solenoid 24 remains energized to continue the driving of tape T. When it is desired to stop the recording on the tape T of video signals being received from source 10, for example, at the random time $t_1$ (FIGS. 2A–2H), control switch 44 is manually actuated or changed over from its contact F to its contact S so as to decrease the potential applied to the set terminal flip-flop circuit 46, for example, from +B to O as on FIG. 2D. As previously described, the resulting negative-going signal $S_4$ applied to the set terminal of flip-flop 46 changes the latter to its set state until the occurrence of the negative-going signal at the time $t_2$ at the conclusion of the next positive pulse or reference signal $S_2$ from multivibrator 29. Such negative-going signal at the conclusion of pulse $S_2$ is received at the reset terminal of flip-flop 46 to return the latter from its set state to its reset state so that flip-flop 46 provides a negative-going signal $S_5$ at the time $t_2$ (FIGS. 2E). Accordingly, flip-flop 46 acts to sense or detect the next-occurring reference signal $S_2$ issuing from multivibrator 29 following the actuation of switch 44 at the time $t_1$.

The monostable multivibrator 47 is triggered to its unstable state by the negative-going signal $S_5$ produced at the output of flip-flop 46 in response to the changeover of the latter from its set state to its reset state so that multivibrator 47 produces a positive pulse for the adjustably predetermined period $\tau_1$ (FIG. 2F). The negative-going signal $S_6$ at the conclusion of time period $\tau_1$ triggers flip-flop 48 from its state providing the nominal 1 output to its state providing the nominal 0 output, as at $S_7$ (FIG. 2G) and, in response to the nominal 0 output, control circuit 50 deenergizes solenoid 24 to permit spring 23 to move pinch roller 21 away from capstan 19 for halting the driving of the tape.

There is, of course, a mechanical time delay $\tau_2$ (FIGS. 2G and 2H) between the time when solenoid 24 is deenergized and the time when driving of the tape actually ceases. However, it is apparent that the variable time constant of monostable multivibrator 47 can be adjusted so that the sum of the pulse period $\tau_1$ and the mechanical time delay period $\tau_2$ is equal to the period of the pulses $S_2-S_{12}$ of the reference signal from multivibrator 29 whereby the tape movement actually ceases at the time $t_3$ which corresponds to the conclusion of the second reference signal $S_{12}$ occurring after the time $t_1$ when the switch 44 is actuated to initiate the stopping of the tape drive. Thus, it will be apparent that, irrespective of the random character of the time $t_1$ when switch 44 is actuated to initiate the stopping of the tape drive, the tape will actually come to rest with control signals 37, for example, the last recorded control signal on the tape in a predetermined position relative to fixed head 35. Since each of control signals 37 has a predetermined position in respect to the corresponding oblique record track, it will be apparent that the tape is stopped with its last recorded oblique track in a predetermined position in respect to the path of rotary heads 14a and 14b.

After a suitable pause in the driving of the tape, that is, when the operator of the apparatus desires to renew the recording of video signals being received from source 10, switch 44 is again actuated to engage its fixed contact F, for example, at the random time $t_4$, so that the potential applied to the set terminal of flip-flop 46 is increased, as at $S_{24}$ (FIG. 2D). In response to such positive-going signal $S_{24}$ applied to its set terminal, flip-flop 46 is changed over from its reset state to its set state in which it remains until the reset terminal of flip-flop 46 receives the negative-going signal at the conclusion of the next-occurring reference signal $S_{32}$ from multivibrator 29 (FIG. 2C) for returning flip-flop 46 to its reset state, as at $S_{25}$ occurring at the output of flip-flop 46 in the time $t_5$, multivibrator 47 is triggered to its unstable state to provide a positive pulse for the predetermined time period $\tau_4$ (FIG. 2F). In response to the negative-going signal $S_{26}$ at the conclusion of such positive pulse from multivibrator 47, flip-flop 48 is changed over, as at $S_{27}$ (FIG. 2G), from the state providing a nominal output 0 to the state providing the nominal 1 output. In response to the nominal 1 output from flip-flop 48, control circuit 50 again energizes solenoid 24 to press pinch roller 21 against rotated capstan 19 and renew the driving of tape T after the further mechanical time delay $\tau_5$. Here again, the variable time constant of multivibrator 47 can be adjusted so that the predetermined period $\tau_4$ of its positive pulse, when added to the mechanical time delay $\tau_5$, will cause the actual commencement of movement of the tape at the time $t_6$ which corresponds with the termination of the second reference signal $S_{42}$ occurring after the random time $t_4$ when the switch 44 is actuated to restart the driving of the tape.

It will be apparent that the adjustably predetermined periods $\tau_1$ and $\tau_4$ of the pulses issuing from multivibrator 47 upon the stopping and starting of the tape drive may be equal to each other, and, in that case, the time constant control circuit 49 interposed between flip-flop 48 and solenoid control circuit 50 is required only in the event that there is a difference between the mechanical time delay period $\tau_2$ for stopping the tape movement and the mechanical time delay period $\tau_5$ for starting the movement of the tape. If the mechanical time delay periods $\tau_2$ and $\tau_5$ are not equal, the time constant control circuit 49 may be constituted by a condenser which is respectively charged and discharged in different time periods so that the actual stopping and starting of the tape movement will occur at equal time delays following the pulse signals $S_6$ and $S_{26}$ from multivibrator 47. Even if the mechanical time delays $\tau_2$ and $\tau_5$ are different, the time constant control circuit 49 may be eliminated if multivibrator 47 is designed so that the period $\tau_1$ of the pulse $S_6$ appearing as the output therefrom upon stopping of the tape drive is sufficiently different from the period $\tau_4$ of pulse $S_{26}$ appearing from the starting of the tape drive to compensate for the difference between the mechanical time delay periods $\tau_2$ and $\tau_5$. On FIG. 2H which indicates the actual stopping and starting of the tape movement, the transients $\tau_3$ and $\tau_6$ occurring at the stopping and starting, respectively, of the tape movement are caused by the inertia of the tape and may be considered insignificant in respect to the standard frame frequency of 30 frames/sec.

It will be apparent that, in the above described arrangement according to this invention, whenever switch 44 is actuated to initiate the stopping of the tape drive, for example, in the time $t_1$ which has a random relationship to the occurrence of the reference or control signals $S_2-S_{42}$ each corresponding to a respective frame of the video signals, flip-flop 46 detects the next-occurring reference signal $S_2$ and, in response to such detection of a reference signal, monostable multivibrator 47 provides a predetermined time delay $\tau_1$ after which flip-flop 48 causes control circuit 50 to deenergize solenoid 24 and thereby bring the tape to rest at a predetermined time period $(\tau_1 + \tau_2)$ following the detected reference or control signal $S_2$. Thus, the tape is actually brought to rest with its last recorded control signal 37 at a predetermined position relative to fixed head 35 and with its last recorded oblique record track at a predetermined position relative to the path of rotary heads 14a and 14b. For example, as shown, multivibrator 47 may be designed so that the predetermined period $\tau_1$ when added to the mechanical time delay period $\tau_2$, provides a total time delay equal to a frame period, in which case, the tape comes to rest with its last recorded control signal 37 precisely at the location of fixed head 35. Similarly, when switch 44 is actuated to again initiate operation of the tape drive, for example, at the time $t_4$ which is in random relation to the reference signals from multivibrator 29 corresponding to the frame periods, flip-flop 46 detects the next-occurring reference signal $S_{32}$ and, in response to such detection of the reference signal multivibrator 47 controls flip-flop 48 to cause control circuit 50 to again energize solenoid 24 with a predetermined time delay period $_4$. Such time delay $\tau_4$ is predetermined so that, when added to the mechanical time delay period $\tau_5$, there is a predetermined time delay, for example, precisely one frame period, between the detected reference signal $S_{32}$ and the actual commencement of movement of the tape by the tape drive at the time $t_6$. Thus, the spacing between the control signal 37 recorded on the tape immediately prior to the stopping of the tape drive and the control signal 37 recorded on the tape immediately following the restarting of the tape drive is made precisely equal to the spacing between adjacent control signals 37 recorded on the tape during normal recording operation, that is, during continuous operation of the tape drive. By reason of the foregoing, there is no phase difference between the control signals, or between the respective video signals, recorded on the tape before and after the splice or editing of the recorded video signals so that, when the edited tape is played back or reproduced jitter will not occur.

The above described arrangement according to this invention may also be employed for editing a tape having video signals already recorded thereon, for exammple, when it is desired to retain only certain portions of the recorded video signals and to replace another or selected portion of the recorded signals with other video signals being received from the source 10. When editing a tape in the foregoing manner, switches 13a, 13b, 28 and 36 are initially engaged with their respective playback contacts P and switch 44 is engaged with its contact F so that tape T is driven during a playback or reproducing operation of the apparatus. During the playback or reproducing operation of the apparatus, fixed head 35 detects the control signals 37 recorded on the tape and produces pulses $S_3$ (FIG. 2B) at the frame frequency (FIG. 2B), and such pulses $S_3$ are supplied through switch 36, pulse shaper 42 and switch 28 to trigger monostable multivibrator 29 which, in response thereto, again produces the reference signal constituted by the chain of pulses $S_2$–$S_{42}$ at the frame frequency (FIG. 2C). The reference signal from multivibrator 29 is compared, by comparator 30, with the reference signals from pulse generator 31 to control motor 17 and thereby ensure that rotary heads 14a and 14b accurately scan the oblique tracks 26a–26n (FIG. 3) in which the video signals are recorded. The reproduced video signals from rotary heads 14a and 14b are supplied through switches 13a and 13b, amplifiers 38a and 38b, angle demodulator 39 and amplifier 40 to output terminal 41 which, as previously mentioned, may be connected to a television receiver or monitor so that the operator can observe the television picture represented by the video signals being reproduced.

At the conclusion of a portion of the recorded video signals to be retained, switch 44 is actuated, for example, at the time $t_1$, to engage its contact S for initiating the stopping of the tape drive. In response to such actuation of switch 44, the circuit 43 operates as previously described, that is, flip-flop 46 detects the next-occurring reference signal $S_2$ and, upon such detection, multivibrator 47 changes over flip-flop 48 with the predetermined time delay period $\tau_i$ for causing control circuit 50 to deenergize solenoid 24 and cause the tape to come to rest in the time $t_3$ at the conclusion of the following reference signal $S_{12}$. Thus, the tape actually comes to rest with the last reproduced control signal 37 in a precisely predetermined position relative to fixed head 35, and with the last reproduced oblique record track in a precisely predetermined position relative to the path of rotary heads 14a and 14b.

After the tape has been brought to rest, as aforesaid, switches 13a, 13b, 28 and 36 are set to engage their respective record contacts R, and switch 44 is actuated to engage its contact F for initiating the driving of the tape for a recording operation of the apparatus during which video signals received from source 10 will be recorded on the tape following the portion of the previously recorded video signals which is to be retained.

Upon such actuation of switch 44, for example, at the random time $t_4$, circuit 43 according to this invention operates in the manner previously described in connection with editing of the tape during recording operation. That is, flip-flop 46 detects the next-occurring reference signal $S_{32}$ from multivibrator 29 following the actuation of switch 44 and, in response to such detection, multivibrator 47 changes over flip-flop 48 with a time delay period $\tau_4$ to cause control circuit 50 to again energize solenoid 24 for commencing the actual movement of the tape at the time $t_6$ coinciding with the conclusion of the following reference signal $S_{52}$. Thus, the first control signal 37 recording on the tape is spaced from the last control signal reproduced from the tape by a distance precisely equal to the normal spacing between the control signals 37 and there will be no phase difference between the control signals 37, or between the video signals, appearing on the tape before and after the location of the splice. Accordingly, the edited tape can be subsequently reproduced without the occurrence of jitter.

In the embodiment of the invention illustrated on FIG. 1, during reproducing or playback operation of the apparatus, the signal $S_3$ at the frame frequency for triggering multivibrator 29 is produced by fixed head 35 from the control signals 37 recorded on the tape. However, the signal at the frame frequency for triggering multivibrator 29 during playback or reproducing operation can be derived from other sources. For example, as shown on FIG. 4, in which the various components of the apparatus are identified by the same reference numerals as on FIG. 1, the output of the amplifier and pulse shaper 32 is applied to the playback contact P of switch 28 as well as to the comparator 30 so that, during reproducing or playback operation, multivibrator 29 is triggered by a signal corresponding to the signal $S_3$ on FIG. 2B, and which is derived from the generator 31 operating in synchronism with the rotation of heads 14a and 14b. Further, in the embodiment of FIG. 4, the playback contact of switch 36 is connected to the playback contact P of an additional record and playback switch 53 which has its movable contact connected to one of the inputs of comparator 30 and its record contact R connected to the output of multivibrator 29. Thus, during recording operation, the output of multivibrator 29 is supplied through switch 53 to comparator 30 for comparison with the output of generator 31, and the output of multivibrator 29 is further supplied through switch 36 to head 35 for recording of the control signals 37 on tape T. On the other hand, during playback or reproducing operation, the control signals reproduced from tape T by head 35 are supplied to comparator 30 for comparison with the reference signals from generator 31 to control the speed of motor 17. Thus, it will be apparent that the signals from generator 31 used to trigger multivibrator 29 are synchronized with the control signals from fixed head 35.

Still another modification of FIG. 1 is illustrated on FIG. 6 in which, during playback or reproducing operation, a portion of the output of one of the amplifiers 38a and 38b is supplied to an envelope detecting circuit 54 which detects or senses the vertical synchronizing porch of the reproduced signals, and the output of such detecting circuit 54 is supplied through a pulse shaper 55 to the playback contact of switch 28. The signal thus supplied to switch 28 is effective to trigger multivibrator 29 in the manner previously described when switch 28 is in its playback position. It will be apparent that the embodiments of this invention illustrated in FIGS. 4 and 6 function similarly to the apparatus described above with reference to FIG. 1 in permitting the editing of a tape without the danger that the control signals 37 and video signals on the tape at locations following a splice or pause in the movement of the tape will be out of phase in respect to the control signals and video signals, respectively, on the tape preceding the location of the splice.

The recording and reproducing apparatus embodying this invention is further advantageous when the driving of the tape is halted for the still or stop motion reproduction of a television picture by the repeated scanning of the video signals recorded in one of the oblique tracks 26a–26n on tape T. Since the angle between the oblique tracks and the longitudinal axis of the tape is influenced by the movement of the tape about guide drum 18 during the recording of the video signals in such oblique tracks, it will be apparent that, when the tape drive is halted for the still or stop motion reproduction of a television picture, rotary heads 14a and 14b will trace a path across the tape, for example, as indicated at 26' or 26'' on FIG. 3, which are at an angle to the directions of the record tracks 26a–26n. When driving of the tape is halted for still or stop motion reproduction of the recorded video signals, if the tape comes to rest in a position such that the path traced by rotary heads 14a and 14b is disposed relative to the record tracks as indicated at 26' on FIG. 3, that is, with the central portion of the path 26' disposed between two adjacent record tracks 26b and 26c, then the rotary heads will reproduce signals from the opposite end portions of such two adjacent record tracks and there will be a signal dropout in the middle portion of the path 26'. As a result of the foregoing, the reproduced still picture on the television monitor will have a band or region at its center in which there is either defective or no picture reproduction. However, as previously described when the apparatus according to this invention is in its reproducing mode of operation and switch 44 is actuated to engage its contact S for initiating the stopping of the tape drive, the tape actually comes to rest with its last reproduced control signal 37 at a precise location relative to fixed head 35, that is, the tape comes to rest at a position where the path 26'' traced by rotary heads 14a and 14b has its central portion registering with the central portion of one of the record tracks, for example, the track 26f. Under the foregoing circumstances, the rotary heads repeatedly tracing the path 26'' accurately reproduce the video signals recorded in track 26f to provide the desired still picture of high clarity and without signal drop-out or other imperfections.

After a period of still reproduction of recorded video signals, as described above, the driving of the tape can be initiated either to record new video signals on the tape following the recorded video signals which were subjected to still reproduction or to resume the normal reproduction of the recorded video signals. with the apparatus of FIG. 1, after a period of still reproduction, switches 13a, 13b, 28 and 36 may be changed-over to engage their respective record contacts R and switch 44 actuated to engage its fixed contact F for initiating driving of the tape T, in which case the reference signals produced by monostable multivibrator 29 are based on, or derived from the video signals from source 10, as previously described, which video signals are to be recorded on the tape following the recorded signals which were subjected to still reproduction.

In the case of the apparatus of FIG. 4, normal reproduction of the recorded video signals can be resumed after a period of still reproduction thereof merely by actuating switch 44 to engage its contact F. In that case, the reference signals produced by monostable multivibrator 29 are derived from the rotational reference signals generated by pulse generator 31 so as to indicate the rotational positions of rotary heads 14a, 14b. As driving of the tape T is commenced, the control signals reproduced by fixed head 35 are compared, in comparator 30, with the rotational reference signals from generator 31 for controlling motor 17 driving the rotary heads 14a, 14b so as to quickly restore the accurate tracking of the record tracks by the rotary heads.

In the case of the apparatus of FIG. 6, normal reproduction of the recorded video signals can also be resumed after a period of still reproduction thereof merely by actuating switch 44 to engage its contact F. In that case, the reference signals produced by monostable multivibrator 29 are derived from the video signals being reproduced by rotary heads 14a, 14b and detected by detector 54. As driving of the tape commences, the rotational reference signals from generator 31 are compared in comparator 30 with the reference signals from monostable multivibrator 29 to control the speed of motor 17 so that the rotary heads 14a, 14b will properly scan the record tracks.

Of course, with the apparatus of either FIG. 4 or FIG. 6, after a period of still reproduction of recorded video signals, the driving of the tape may be initiated with the apparatus in its recording mode, in which case the reference signals produced by monostable multivibrator 29 are derived from the video signals to be recorded on the tape following the signals which were subjected to still reproduction.

In the case of a magnetic recording and reproducing apparatus of the described type operated from the usual household A C. electrical source, it is customary to continue the rotation of the rotary heads 14a and 14b and guide drum 18 during a temporary halt or pause in the driving of the tape, for example, when editing the tape in the manner described above. However, in the case of a battery powered apparatus, the rotation of heads 14a and 14b and of the guide drum 18 is usually halted during a pause or temporary halt in the driving of the tape so as to conserve the supply of electrical power in the battery. With such an arrangement, when there has been a temporary halt or pause in the driving of the tape and also of the rotary heads, a certain period of time is required to bring the rotary heads up to their normal rotational speed upon the renewal of the driving of the rotary heads and of the tape.

Referring now to FIG. 7, it will be seen that, in an embodiment of this invention which is generally similar to that described in connection with FIG. 1 and has its several components identified by the same reference numerals, but which is particularly suited for use in connection with a battery powered magnetic recording and reproducing apparatus, a gate circuit 56 is interposed between the movable contact of control switch 44 and the set terminal of flip-flop 46 so that the latter responds to the actuation of switch 44 as previously described only when gate 56 is open by a suitable signal. Further, as shown, switch 44 may be connected to motor control circuit 34 so that, upon the actuation of switch 44 to engage its contact S for initiating the stopping of the tape drive, motor control circuit 34 also responds to such actuation of switch 44 to stop the operation of motor 17, preferably after a suitable time delay following such actuation of switch 44.

The embodiment of this invention shown on FIG. 7 further comprises a monostable multivibrator 57 triggered by a portion of the output from generator 31 to produce a chain of pulses at a frequency that is dependent upon the rotational speed of heads 14a and 14b driven by motor 17. The pulses constituting the output of multivibrator 57 are supplied to an integrating circuit 58 which produces an output voltage in dependence on the frequency of the pulses from multivibrator 57. A level detecting circuit 59 detects the level of the output voltage from integrating circuit 58 and, when the level of such output voltage exceeds a predetermined value approximately corresponding to output voltage for the standard frame frequency, level detecting circuit 59 provides an output signal which is supplied to gate 56 for opening the latter.

During continuous recording or reproducing operation of the apparatus shown on FIG. 7, rotary heads 14a and 14b are rotated at approximately the normal speed, and hence level detecting circuit 59 provides the necessary output signal for opening gate 56, for example, as indicated at the left-hand end portion of the wave form shown on FIG. 8D'. When switch 44 is actuated at the time $t_1$ (FIG. 8A) to engage its contact S for initiating a temporary halt or pause in the driving of the tape, for example, when it is desired to edit the tape in the previously described manner, the resulting change in the potential at the movable contact of switch 44 from +B to O (FIG. 8D) is communicated through open gate 56 to the set terminal of flip-flop 46 so that the latter is changed over to its set stage (FIG. 8E). The negative-going signal at the conclusion of the next-occurring reference signal $S_2$ from multivibrator 29 is applied to the reset terminal of flip-flop to change the latter to its reset state. The resulting negative-going signal $S_5$ (FIG. 8E) from flip-flop 46 triggers multivibrator 47 so that the latter produces an output pulse for the period $\tau_1$ and, at the conclusion $S_6$ (FIG. 8F) of such pulse, flip-flop 48 is changed-over to its state producing the nominal 0 output (FIG. 8G) for causing control circuit 50 to deenergize solenoid 24. Thus, as in the previously described embodiments of this invention, upon the actuation of switch 44 to engage its contact S, the tape comes to rest at the time $t_3$ in which its last recorded or reproduced control signal 37 is precisely located in respect to the fixed head 35 and the respective oblique record track is also precisely located in respect to the path or rotary heads 14a and 14b. The motor control circuit 34 preferably responds to such actuation of switch 44 so as to discontinue the operation of motor 17 only after a suitable time delay following the actuation of switch 44 so that, as shown on FIG. 8D', the rotational speed of heads 14a and 14b, as detected by components 57, 58 and 59, only falls below its normal level required to maintain gate 56 in its open condition after actual movement of the tape has ceased at the time $t_3$.

When switch 44 is again actuated to engage its contact F, for example, at the time $t_4$, for initiating the driving of the tape, the increase in the potential at the movable contact of switch 44, as at $S_{24}$ (FIG. 8D) is communicated to motor control circuit 34 so that operation of motor 17 is commenced. However, a period of time T (FIG. 8A) is required after the actuation of switch 44 for bringing heads 14a and 14b up to their normal rotational speed. During such time T, the output voltage of integrating circuit 58 detected by level detecting circuit 59 is below the predetermined value so that there is no output signal from circuit 59 and gate 56 remains in its closed condition. However, at the time $t'_4$ at which heads 14a and 15b attain their normal rotational speed, the output voltage of integrating circuit 58 rises above the predetermined level and is detected by circuit 59 which, accordingly, provides the necessary output signal for opening gate 56, as indicated on FIG. 8D'. Thus, at the time $t'_4$, the relatively high or positive voltage +B applied to the movable contact of switch 44 is effective to increase the potential at the set terminal of flip-flop 46 and to cause changeover of flip-flop 46 to its set state whereupon the circuit arrangement of FIG. 7 operates in precisely the same manner as has been described with reference to FIG. 1 so as to cause the actual commencement of movement of the tape at the time $t_6$. Thus, with the circuit arrangement of FIG. 7, the actual commencement of movement of the tape occurs at a precisely predetermined time, for example, one frame period, following the reference signals $S_{32}$ (FIG. 8C) next-occuring after heads 14a and 14b have attained their normal operating speed. In view of the foregoing, the apparatus of FIG. 7 also ensures that there will be no phase error or deviation between the control signals 37 or the video signals on the tape prior to and following the splice or pause in the driving of the tape.

Although several illustrative embodiments of the invention have been described herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a magnetic recording and reproducing apparatus having rotary head means moved in a circular path for selectively recording and reproducing video signals in respective tracks extending obliquely across a magnetic tape as the latter is transported in one longitudinal direction of the tape; the combination of drive means for effecting the longitudinal transport of the tape including a rotated capstan and a pinch roller movable toward and away from said capstan with the tape therebetween for starting and stopping, respectively, the operation of said drive means and hence the transporting of the tape in said one longitudinal direction, means for producing reference signals in correspondence to the video signals recorded in each of said tracks, means for producing rotational reference signals indicative of the rotational position of said rotary head means, comparator means for compraring the phase of said rotational reference signals with the phase of the first mentioned reference signals at least during the recording operation of the apparatus, means for controlling the rotational movements of said rotary head means in dependence on the phase comparison of said first and rotational reference signals at least during said recording operation of the apparatus so as to record predetermined periods of the video signals in said respective tracks, control means selectively actuable between first and second positions for initiating the starting and stopping, respectively, of the operation of said drive means, detecting means conditioned by actuation of said control means for detecting the occurrence of a predetermined one of said first reference signals following an actuation of said control means, and means controllable by said detecting means upon the detection by the latter of said predetermined first reference signal for selectively stopping and starting the operation of said drive means in dependence upon the positioning of said control means in said second and first positions, respectively, so that, on stopping the operation of the drive means, the tape is brought to rest in a predetermined position in respect to said circular path and, on starting said operation of the drive means, at least during said recording operation, the commencement of the movement of the tape from said position of rest occurs with said rotary head means in a predetermined rotational position.

2. A recording and reproducing apparatus according to claim 1; in which said means controllable by said detecting means includes delay means for delaying said starting and stopping, respectively, of said drive means for predetermined periods following said detection of the predetermined reference signal.

3. A recording and reproducing apparatus according to claim 1; further comprising fixed head means selectively operable to record and reproduce control signals at spaced apart locations along said tape corresponding to the oblique tracks; and in which, during recording operation of the apparatus, said reference signals are supplied to said fixed head means for recording by the latter as said control signals and, during reproducing operation of said apparatus, said means for producing reference signals derives the latter from said control signals reproduced by said fixed head means.

4. A recording and reproducing apparatus according to claim 1; further comprising fixed head means selectively operable to record and reproduce signals at spaced apart locations along said tape corresponding to the oblique tracks; and in which, during recording operation of the apparatus, said first reference signals are derived from said video signals to be recorded and are supplied to said fixed head means for recording by the latter as said control signals on the tape, and, during reproducing operation of the apparatus, said first reference signals are derived from said control signals reproduced by said fixed head means.

5. A recording and reproducing apparatus according to claim 1; further comprising fixed head means selectively operable for recording and reproducing control signals at spaced apart locations along the tape corresponding to the oblique tracks; and in which, during said recording operation of the apparatus, said first reference signals are derived from said video signals to be recorded and are supplied to said fixed head means for recording by the latter as said control signals, and, during reproducing operation of the apparatus, said first reference signals are derived from said rotational reference signals and said control signals reproduced by said fixed head means are supplied to said comparator for phase comparison with said rotational reference signals in controlling said rotational movements of said rotary head means.

6. A recording and reproducing apparatus according to claim 1; in which, during said recording operation of the apparatus, said first reference signals are derived from said video signals to be recorded, and, during the reproducing operation of the apparatus, said first reference signals are derived from the video signals reproduced from the tape by said rotary head means.

7. A recording and reproducing apparatus according to claim 1; further comprising means responsive to the rotational speed of said rotary head means for rendering said detecting means operative for detecting said one reference signal only when said rotational speed is at least above a predetermined level.

8. A recording and reproducing apparatus according to claim 1; in which said drive means includes pinch roller control means having a first state in which said pinch roller is moved against said capstan to drive the tape and a second state in which said pinch roller is moved away from the capstan to halt the tape movement; the movement of said pinch roller against said capstan and away from said capstan is achieved with first and second mechanical time delays, respectively, following the conditioning of said pinch roller control means in said first and second states, respectively; and said means controllable by said detecting means includes electrical delay means for selectively conditioning said pinch roller control means in said first and second states with first and second electric time delays after the detection of said predetermined first reference signal, which first and second electrical time delays when added to said first and second mechanical time delays, respectively, are substantially equal to the period between successive first reference signals.

9. A recording and reproducing apparatus according to claim 8; in which said first and second mechanical time delays are unequal and said electrical delay means establishes different first and second electrical time delays to compensate for the inequality of said first and second mechanical time delays.

10. A recording and reproducing apparatus according to claim 1; in which said detecting means includes first flip-flop means, said control means is operative upon each actuation thereof for changing a potential applied to said first flip-flop means and thereby conditioning the latter in a first state thereof, and said first flip-flop means receives said first reference signals and is changed-over from said first state to a second state in response to said first reference signals; in which said means controllable by said detecting means includes monostable multivibrator means triggered to an unstable state in response to the change-over of said first flip-flop means from said first state to said second state to provide an output signal for a predetermined period, second flip-flop means alternately switching between first and second states at the conclusion of each successive output signal from said multivibrator means, and means for stopping and starting the movement of the tape by said drive means with first and second mechanical time delays in response to said first and second states, respectively, of said second flip-flop means; and in which said means for stopping and starting the tape movement has electrical connection means to said second flip-flop means by which the aggregate time delays composed of said predetermined period of the output signal from said multivibrator means and of said first and second mechanical time delays, respectively, are each made substantially equal to the period between successive first reference signals.

11. A recording and reproducing apparatus according to claim 10; in which said means for stopping and starting the movement of the tape by said drive means includes solenoid means connected with said pinch roller for moving the latter away from said capstan when said solenoid means is deenergized in response to said first state of the second flip-flop means and for moving said pinch roller against the capstan when said solenoid means is energized in response to said second state of said second flip-flop means.

12. A recording and reproducing apparatus according to claim 10; in which said first and second mechanical time delays are unequal, and said electrical connection means includes time constant control means having different time constants for switching of said second flip-flop means from said first state to said second state and from said second state to said first state, respectively, so as to equalize said aggregate time delays.

13. A recording and reproducing apparatus according to claim 10; further comprising fixed head means selectively operable to record and reproduce control signals at spaced apart locations along said tape corresponding to the oblique tracks; and in which, during recording operation of the apparatus, said first reference signals are supplied to said fixed head means for recording by the latter as said control signals and, during reproducing operation of said apparatus, said means for producing the first rererence signals derives the latter from said control signals reproduced by said fixed head means.

14. A recording and reproducing apparatus according to claim 10; further comprising fixed head means selectively operable to record and reproduce control signals at spaced apart locations along said tape corresponding to the oblique tracks; and in which, during recording operation of the apparatus, said first reference signals are derived from said video signals to be recorded and are supplied to said fixed head means for recording by the latter as said control signals on the tape, and, during reproducing operation of the apparatus, said first reference signals are derived from said control signals reproduced by said fixed head means.

15. A recording and reproducing apparatus according to claim 10; further comprising fixed head means selectively operable for recording and reproducing control signals at spaced apart locations along the tape corresponding to the oblique tracks; and in which, during said recording operation of the apparatus, said first reference signals are derived from said video signals to be recorded and are supplied to said fixed head means for recording by the latter as said control signals, and, during reproducing operation of the apparatus, said first reference signals are derived from said rotational reference signals and said control signals reproduced by said fixed head means are supplied to said comparator for phase comparison with said rotational reference signals in controlling said rotational movements of said rotary head means.

16. A recording and reproducing apparatus according to claim 10; in which, during said recording operation of the apparatus, said first reference signals are derived from said video signals to be recorded, and, during the reproducing operation of the apparatus, said first reference signals are derived from the video signals reproduced from the tape by said rotary head means.

17. A recording and reproducing apparatus according to claim 10; further comprising gate means having open and closed states and being interposed between said first flip-flop means and said control means so that said first flip-flop means can respond to said actuation of said control means only when said gate means is in said open state thereof, and means responsive to the rotational speed of said rotary head means for conditioning said gate means in said open state thereof only when said rotational speed of the rotary heads attains at least a predetermined level.

* * * * *

UNITED STATES PATENT OFFICE
CERTIFICATE OF CORRECTION

Patent No. 3,968,518          Dated July 6, 1976

Inventor(s) Nobutoshi Kihara and Tsuguo Miki

It is certified that error appears in the above-identified patent and that said Letters Patent are hereby corrected as shown below:

[75] Inventors: line 2, change "Tachikawa" to --Tokyo--.

Column 2, line 29, change "192" to --transport--,

Column 5, line 53, after "the" insert --time--,

Column 6, line 9, change "32" to --31--,

Column 7, line 41, change "responsee" to --response--

Column 8, line 3, change "ecample" to --example--,

Column 9, line 13, change "$S_z - S_{12}$" to --$S_2 - S_{12}$--,

Column 10, line 53, after "in" insert --a--,

Column 11, line 13, change "examm-" to --exam---,

Column 16, line 56, change "compraring" to --comparing--,

Column 17, line 36, after "reproduce" insert --control--,

Column 19, line 21, change "rererence" to --reference--.

Signed and Sealed this

Fourth Day of January 1977

[SEAL]

Attest:

RUTH C. MASON
Attesting Officer

C. MARSHALL DANN
Commissioner of Patents and Trademarks